United States Patent [19]

Mukai

[11] Patent Number: 5,329,445
[45] Date of Patent: Jul. 12, 1994

[54] IMAGE FILING APPARATUS PREVENTING THE STORAGE OF INCORRECT INFORMATION

[75] Inventor: Hachiro Mukai, Kanagawa, Japan

[73] Assignee: Fuji Photo Film Co., Ltd., Kanagawa, Japan

[21] Appl. No.: 632,848

[22] Filed: Dec. 24, 1990

[30] Foreign Application Priority Data

Dec. 25, 1989 [JP] Japan .................. 1-335865

[51] Int. Cl.$^5$ .................................... G06F 15/42
[52] U.S. Cl. ......................... 364/413.01; 364/413.13; 395/600
[58] Field of Search ............... 364/413.01, 413.02, 364/413.13; 250/327.2; 395/600

[56] References Cited

U.S. PATENT DOCUMENTS

| | | | |
|---|---|---|---|
| 4,602,333 | 7/1986 | Komori | 364/413.13 |
| 4,606,025 | 11/1986 | Peters et al. | 371/21.1 |
| 4,705,953 | 11/1987 | Kimura et al. | |
| 4,739,480 | 4/1988 | Oono et al. | 364/413.13 |
| 4,817,050 | 3/1989 | Komatsu et al. | 364/DIG. 2 |
| 4,831,526 | 3/1989 | Luchs et al. | 364/401 |
| 4,888,690 | 12/1989 | Huber | 395/600 |
| 4,958,283 | 9/1990 | Tawara et al. | 364/413.13 |
| 4,992,663 | 2/1991 | Takeo | 250/327.2 |
| 4,999,497 | 3/1991 | Funahashi et al. | 250/327.2 |
| 5,019,975 | 5/1991 | Mukai | 364/413.13 |
| 5,086,392 | 2/1992 | Nakajima | 364/413.22 |
| 5,140,518 | 8/1992 | Ema | 364/413.01 |

Primary Examiner—Robert A. Weinhardt
Assistant Examiner—A. Bodendorf
Attorney, Agent, or Firm—Sughrue, Mion, Zinn, Macpeak & Seas

[57] ABSTRACT

An image filing apparatus comprises a drive device which is loaded with an optical disk capable of storing a plurality of signals, and with which image signals representing images and subsidiary information belonging to each of the images are stored on the optical disk and read therefrom. When the image signals and the subsidiary information corresponding to each of the image signals are stored on the optical disk loaded into the drive device, a data base constructing device constructs an image signal retrieving data base from the subsidiary information such that an image signal corresponding to the subsidiary information may be retrieved. A storage device stores the data base such that it can be rewritten. A data base construction preventing device inspects the subsidiary information when an image signal and the subsidiary information corresponding to the image signal are stored on the optical disk loaded into the drive device. In cases where the subsidiary information has been found to be abnormal, a data base is prevented from being constructed from the subsidiary information.

14 Claims, 4 Drawing Sheets

ың image signal. Also, a data base is constructed from the incorrect subsidiary information.

Even if incorrect subsidiary information is entered, no serious problem will occur when it is stored on an optical disk. However, a serious problem will often occur when a data base is constructed. For example, if an unexpected value (e.g. 1800) is entered as the date on which the image was recorded, normal regions of the data base will be destroyed, and it will become impossible for image signals corresponding to normal subsidiary information to be retrieved.

In order for the aforesaid problems to be eliminated, it will be considered to provide a means for preventing a data base corresponding to normal subsidiary information from being destroyed. However, in such cases, problems occur in that an incorrect data base is constructed from incorrect subsidiary information, and in that an image signal corresponding to the incorrect subsidiary information cannot be retrieved.

IMAGE FILING APPARATUS PREVENTING THE STORAGE OF INCORRECT INFORMATION

BACKGROUND OF THE INVENTION

1. Field of the Invention

This invention relates to an image filing apparatus wherein image signals, which represent images, and subsidiary information belonging to each of the images are stored on an optical disk, an image signal retrieving data base is constructed from the subsidiary information such that an image signal corresponding to the subsidiary information may be retrieved, and the image signal retrieving data base is used during the retrieval of the image signals.

2. Description of the Prior Art

Image filing apparatuses for filing image signals, which represent images, have heretofore been used in various fields. For example, at medical facilities, such as hospitals, many kinds of medical images are utilized for medical treatment or research. Most of the medical images are radiation images. In recent years, many computed tomography (CT) images, magnetic resonance (MR) images, and the like, are also utilized.

The medical images should be stored to permit investigation of changes in diseases or injuries of patients, and it is legally stipulated that the medical images must be stored for a predetermined period. Therefore, in hospitals, or the like, the number of stored medical images increases daily. The medical images have heretofore been stored in the form of hard copies. However, storage as hard copies requires a large storage space and burdensome operations for control and retrieval of the medical images in hospitals, or the like.

Accordingly, in recent years, an image filing apparatus has been proposed in which images, such as medical images, are retrievably stored (i.e. filed) as image signals on a storage medium. In cases where the medical images are filed in this manner on the storage medium, the space requirement and the burden of image storage can be reduced, and the images can be retrieved easily and quickly.

In the image filing apparatus for filing the image signals in the manner described above, a data base is constructed from subsidiary information corresponding to each of the image signals and is used during the retrieval of the image signals.

In general, image signals are detected automatically when images are read out with an image read-out apparatus, or the like. On the other hand, subsidiary information is ordinarily entered from, for example, a keyboard each time the corresponding image is recorded on a recording medium. In cases where the image is a medical radiation image of a patient, the subsidiary information includes, for example, the name of the patient recorded, the date on which the image was recorded, the name of the image recording apparatus which was used to record the image, the portion of a patient the image of which was recorded (e.g., the head, the chest, or the abdomen), and the mode which was used when the image was recorded (e.g., an ordinary image recording mode, an enlarged image recording mode, or a tomography mode). When the subsidiary information is entered from a keyboard, or the like, it often occurs that incorrect subsidiary information is entered by mistake. In such cases, the incorrect subsidiary information is stored on an optical disk together with the correspond-

SUMMARY OF THE INVENTION

The primary object of the present invention is to provide an image filing apparatus wherein, even if incorrect subsidiary information is entered by mistake, no data base is destroyed, nor is an incorrect data base constructed.

Another object of the present invention is to provide an image filing apparatus wherein a correct data base is constructed in cases where incorrect subsidiary information is entered by mistake and is then corrected.

The present invention provides a first image filing apparatus provided with:

i) a drive means which is loaded with an optical disk capable of storing a plurality of signals, and with which image signals representing images and subsidiary information belonging to each of the images are stored on the optical disk and read therefrom, ii) a data base constructing means with which, when the image signals and the subsidiary information corresponding to each of the image signals are stored on the optical disk loaded into the drive means, an image signal retrieving data base is constructed from the subsidiary information such that an image signal corresponding to the subsidiary information may be retrieved, and iii) a storage means which stores the data base such that it can be rewritten, wherein the improvement comprises the provision of a data base construction preventing means which inspects the subsidiary information when an image signal and the subsidiary information corresponding to the image signal are stored on the optical disk loaded into the drive means, and which prevents a data base from being constructed from the subsidiary information in cases where the subsidiary information has been found to be abnormal.

The present invention also provides a second image filing apparatus provided with:

i) a drive means which is loaded with an optical disk capable of storing a plurality of signals, and with which image signals representing images and subsidiary information belonging to each of the images are stored on the optical disk and read therefrom, ii) a data base constructing means with which, when the image signals and the subsidiary information corresponding to each of the image signals are stored on the optical disk loaded into the drive means, an image signal retrieving data base is constructed from the subsidiary information such that an image signal corresponding to the subsidiary information may be retrieved, and iii) a storage means which stores the data base such that it can be rewritten, wherein the improvement comprises the provision of:

a) a data base construction preventing means which inspects the subsidiary information when an image signal and the subsidiary information corresponding to the image signal are stored on the optical disk loaded into the drive means, and which prevents a data base from being constructed from the subsidiary information in cases where the subsidiary information has been found to be abnormal, b) an input means with which a correction signal is entered, the correction signal being used to rewrite the subsidiary information, which has been stored on the optical disk loaded into the drive means, and c) a data base reconstructing means with which, in cases where the correction signal is entered from the input means, a data base is reconstructed from subsidiary information, which has been corrected with the correction signal.

The term "subsidiary information" as used herein means various kinds of information giving specifics about an image. By way of example, in cases where the image is a medical radiation image of a patient, the subsidiary information includes the name of the patient (object) recorded, the date on which the image was recorded, the portion of a patient the image of which was recorded (e.g., the head, the chest, or the abdomen), the mode which was used when the image was recorded (e.g., an ordinary image recording mode, an enlarged image recording mode, a tomography mode, or a contrasted image recording mode), and a number representing a branch of medicine (e.g., the internal medicine or the surgery).

What subsidiary information should be found to be abnormal is a mere item of design and is not limited to specific information. For example, in cases where the subsidiary information includes the date, on which the image was recorded, and only dates from Jan. 1, 1920 onward are supported as the date on which the image was recorded, dates before Jan. 1, 1920 are found to be abnormal. Also, in cases where numbers 1 through 30 are supported as the numbers representing branches of medicine (e.g., the internal medicine and the surgery), numbers higher than 30 are found to be abnormal.

The first image filing apparatus in accordance with the present invention is provided with the data base construction preventing means which inspects the subsidiary information, and which prevents a data base from being constructed from the subsidiary information in cases where the subsidiary information has been found to be abnormal. Therefore, with the first image filing apparatus in accordance with the present invention, even if abnormal subsidiary information is entered by mistake, no data base will be destroyed, nor will an incorrect data base be constructed.

In this case, a data base corresponding to the abnormal subsidiary information is not constructed. However, the abnormal subsidiary information is stored on the optical disk together with the corresponding image signal. Therefore, by directly referring to the optical disk, the image signal corresponding to the abnormal subsidiary information can be read from the optical disk.

The second image filing apparatus in accordance with the present invention is provided with the data base construction preventing means which is of the same type as that of the first image filing apparatus in accordance with the present invention. The second image filing apparatus in accordance with the present invention is also provided with the input means with which a correction signal is entered, the correction signal being used to rewrite the subsidiary information, which has been stored on the optical disk. The second image filing apparatus in accordance with the present invention is further provided with the data base reconstructing means with which, in cases where the correction signal is entered from the input means, a data base is reconstructed from subsidiary information, which has been corrected with the correction signal. Therefore, in cases where incorrect subsidiary information has been entered by mistake, it can be corrected. Also, a correct data base can be constructed, with which an image signal corresponding to subsidiary information, which has been corrected with the correction signal, can be retrieved.

DESCRIPTION OF THE PREFERRED EMBODIMENTS

The present invention will hereinbelow be described in further detail with reference to the accompanying drawings.

Figure 1:
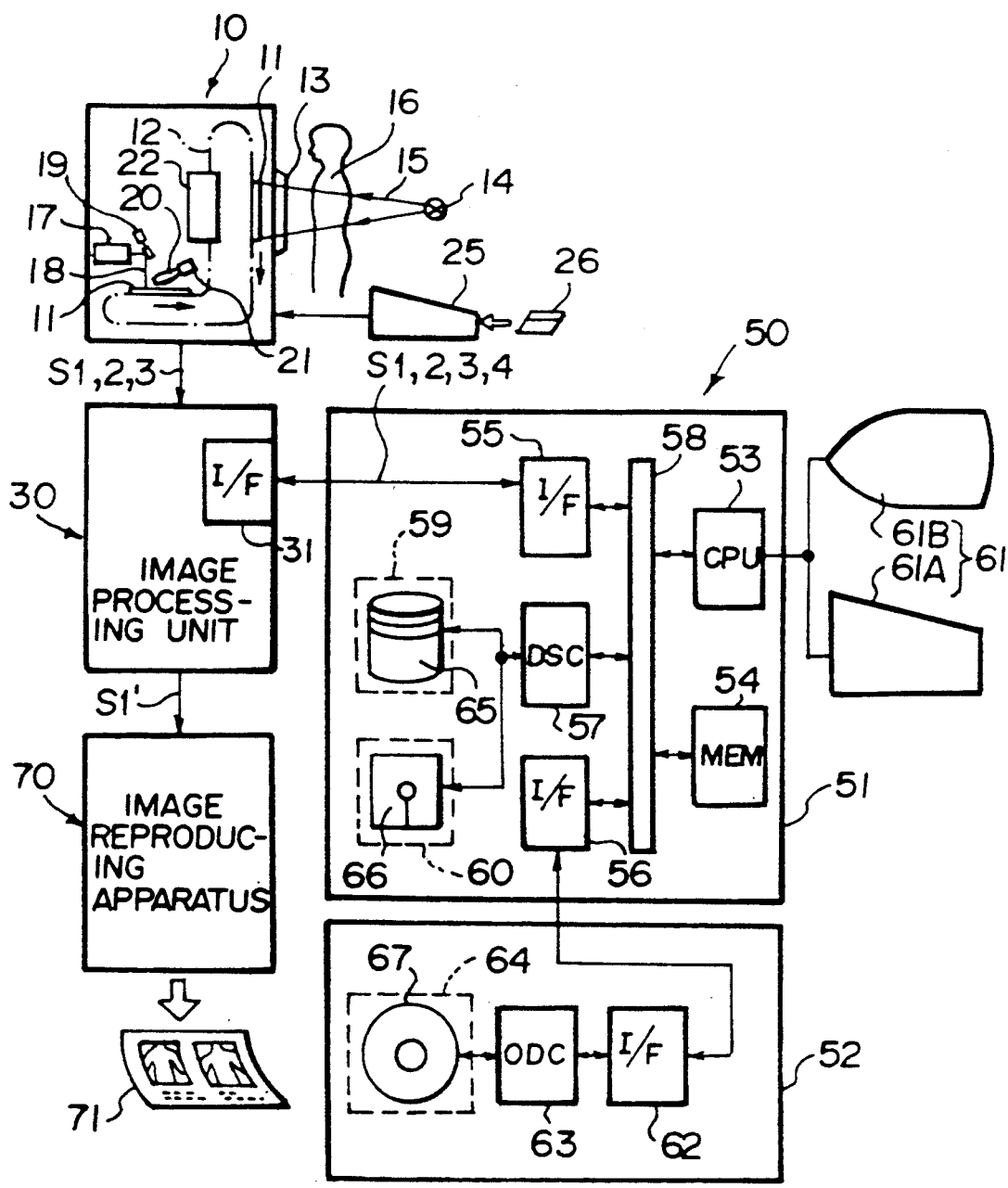
FIG. 1 is a schematic view showing an example of the image filing and reproducing system provided with an embodiment of the image filing apparatus in accordance with the present invention.

Referring to FIG. 1, an image filing apparatus 50 is constituted of a system control device 51, and an optical disk device 52, which constitutes an example of the drive means of the image filing apparatus in accordance with the present invention. With the optical disk device 52, signals are stored on an optical disk and are read therefrom. The image filing apparatus 50 also comprises an operating console 61 consisting of a keyboard 61A, which constitutes an example of the input means of the image filing apparatus in accordance with the present invention, and a display unit 61B, which may be constituted of a cathode ray tube (CRT) or the like. The image filing apparatus 50 is connected to an image processing unit 30. The image processing unit 30 receives an image signal S1 from a radiation image recording and read-out apparatus 10, which constitutes an example of an image signal source. The image processing unit 30 carries out predetermined image processing on the image signal S1, and sends an image signal S1', which has been obtained from the image processing, to an image reproducing apparatus 70.

The radiation image recording and read-out apparatus 10 may be of the type disclosed in, for example, U.S. patent application Ser. No. 755,992, now U.S. Pat. No. 5,028,785, or U.S. Pat. No. 4,705,953. In the radiation image recording and read-out apparatus 10, stimulable phosphor sheets 11, 11 are conveyed and circulated along a circulation path 12. A stimulable phosphor sheet 11 is stopped at the position facing an image recording stand 13 and is exposed to radiation 15, which is produced by a radiation source 14 and which has passed through an object (patient) 16. In this manner, a radiation image of the object 16 is stored on the stimulable phosphor sheet 11. The stimulable phosphor sheet 11, on which the radiation image has been stored, is conveyed to an image read-out section and two-dimensionally scanned with a laser beam 18, which is produced by a laser beam source 17 and deflected by a light deflector 19. The laser beam 18 serves as stimulating rays. As the stimulable phosphor sheet 11 is exposed to the laser beam 18, the exposed portion of the sheet 11 emits light in proportion to the amount of energy stored thereon during its exposure to the radiation 15. The emitted light is photoelectrically detected by a photodetector 21, which is constituted of a photomultiplier or the like, via a light guide member 20. An analog output signal generated by the photodetector 21 is amplified and converted into a digital image signal S1. The digital image signal S1, which is thus obtained and which represents the radiation image of the object 16, is fed out of the radiation image recording and readout apparatus 10. After the image read-out operation is finished in this manner, the stimulable phosphor sheet 11 is sent to an erasing section 22. At the erasing section 22, the stimulable phosphor sheet 11 is exposed to erasing light, and any energy remaining on the sheet 11 is erased to such an extent that the sheet 11 may be reused for the recording of a radiation image.

The radiation image recording and read-out apparatus 10 is connected to an ID terminal 25. At the ID terminal 25, information written on an ID card 26 for the patient 16 (hereinafter referred to as patient information) is read out. The patient information includes, for example, the name, the sex, and the date of birth of the patient. Also, information about characteristics of the recorded radiation image (hereinafter referred to as image characteristics information) is entered at the ID terminal 25. The image characteristics information includes, for example, the image number, the date on which the image was recorded, the portion of the object the image of which was recorded, the size of the recorded image, and the sensitivity with which the image is read out. The patient information S2 and the image characteristics information S3 are fed to the image processing unit 30 together with the image signal S1. In this embodiment, the patient information S2, the image characteristics information S3, and other accompanying information constitute an example of the subsidiary information in the image filing apparatus in accordance with the present invention.

The image processing unit 30 can carry out, for example, at least 20 types of gradation processes and at least 10 types of frequency response processes on the digital image signal S1. The image processing conditions are tabulated, and optimal image processing conditions are automatically selected from the table in accordance with the characteristics of the recorded radiation image, which are designated at the ID terminal 25. The image signal S1', which is obtained by carrying out image processing under optimal conditions in the image processing unit 30, is sent to the image reproducing apparatus 70.

By way of example, the image reproducing apparatus 70 is composed of a light beam scanning and recording apparatus for two-dimensionally scanning photographic film with a light beam, which has been modulated in accordance with the image signal S1' and an automatic developing machine for developing the film, which has been exposed to the light beam. With the image reproducing apparatus 70, the image represented by the image signal S1', i.e. the radiation image of the patient 16, is recorded as a hard copy 71 on the photographic film.

The hard copy 71 of the radiation image, which has been formed on the photographic film in the manner described above, is utilized for making a diagnosis of the patient 16. Instead of being constituted of the light beam scanning and recording apparatus and the automatic developing machine, the image reproducing apparatus 70 may be constituted of a CRT display device, or the like.

How an image signal representing a radiation image is stored (filed) by the image filing apparatus 50 will be described hereinbelow. The system control device 51 of the image filing apparatus 50 is constituted of a known computer system. Specifically, the system control device 51 is composed of a central processing unit (CPU) 53, a memory 54, interfaces 55 and 56, a control unit 57, a bus 58 which connects these sections, a fixed magnetic disk drive unit 59, and a floppy disk drive unit 60. The control unit 57 controls the fixed magnetic disk drive unit 59 and the floppy disk drive unit 60. The fixed magnetic disk drive unit 59 and the control unit 57 constitute an example of the storage means of the image filing apparatus in accordance with the present invention. The aforesaid keyboard 61A and the display unit 61B are connected to the CPU 53, and the interface 55 is connected to an interface 31 of the image processing unit 30. The optical disk device 52 is composed of an interface 62, which is connected to the interface 56 of the system control device 51, an optical disk drive control unit 63, and an optical disk drive unit 64. An optical disk 67 is inserted into the optical disk drive unit 64. In this embodiment, signals can be stored on both surfaces (surfaces A and B) of the optical disk 67. The optical disk drive unit 64 can access only one surface of the optical disk 67. In order for the other surface of the optical disk 67 to be accessed, the optical disk 67 must be turned upside down.

The subsidiary information, such as the aforesaid patient information S2 and the image characteristics information S3, is transferred from the image processing unit 30 to the system control device 51, and recorded on the fixed magnetic disk 65, which is operated by the fixed magnetic disk drive unit 59. In this manner, a data base is constructed on the fixed magnetic disk 65 from the subsidiary information. A floppy disk 66 is operated by the floppy disk drive unit 60 and is utilized for control of system operations. The subsidiary information, such as the patient information S2 and the image recording information S3, is also transferred to the optical disk device 52, and filed on the optical disk 67 together with the image signal S1, which is transferred from the image processing unit 30. At this time, the image signal S1 by-passes the image processing section in the image processing unit 30, and is recorded on the optical disk 67 in the form of a raw signal which has not been subjected to the image processing. Also, information S4 about the image processing conditions, under which the image signal S1 is to be processed, is fed out of the image processing unit 30 and stored on the optical disk 67.

Figure 2:
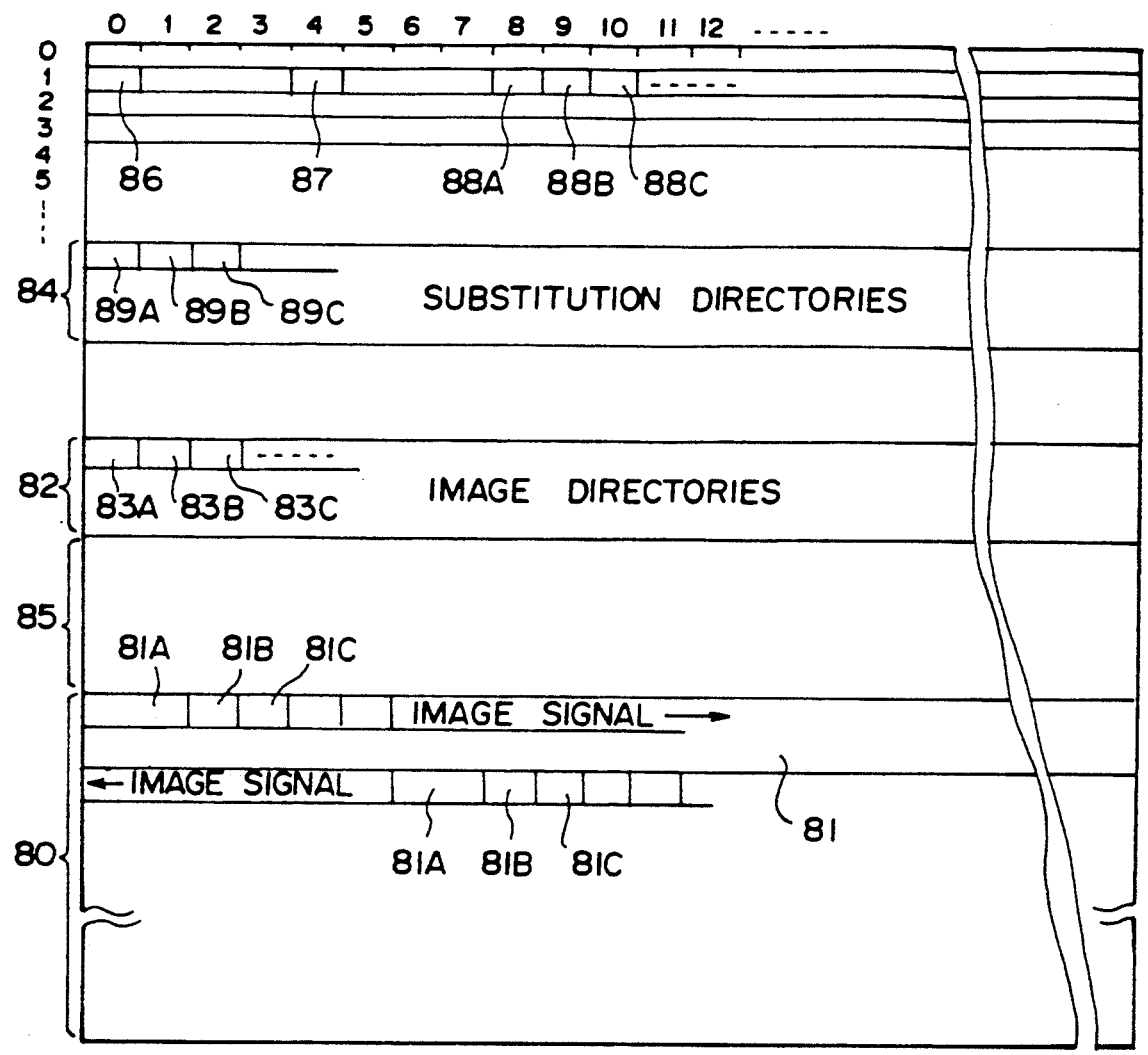
FIG. 2 is an explanatory view showing an example of the recording format on an optical disk.

FIG. 2 is an explanatory view showing an example of the recording format on the optical disk 67. How the image signal S1 and the subsidiary information, such as the patient information S2 and the image characteristics information S3, are recorded on the optical disk 67 will hereinbelow be described in detail with reference to FIG. 2.

In FIG. 2, each graduation along the vertical axis indicates a single track on the optical disk 67, and each graduation along the horizontal axis indicates a single sector. Image signals are recorded in units of a single image in an image signal recording region 80, which is sufficiently broadly formed on the optical disk 67. A header 81A and blocks 81B and 81C are located before and after an image signal area 81, in which an image signal representing a single image is recorded. The subsidiary information, such as the patient information S2 and the image characteristics information S3, corresponding to an image signal S1, which represents a single image and which is recorded in the image signal area 81, is recorded in the header 81A. The information S4 about the image processing conditions, which are to be used in the image processing unit 30, is recorded in the blocks 81B and 81C.

When the image signal S1 has been recorded in the image signal area 81 on the optical disk 67 in the manner described above, one of the image directories 83A, 83B, 83C, . . . that corresponds to the image signal S1, which has been recorded in the image signal area 81, is recorded in an image directory region 82. Basically, in each of the image directories 83A, 83B, 83C, . . ., the head address of the header 81A for the image signal S1, which has been recorded in the image signal area 81, the sector length of the image signal S1, and characteristic information about the image signal S1 are recorded.

The optical disk 67 is also provided with a region 84 for forming substitution directories 89A, 89B, 89C, . . ., which are used for substitution of the image directories 83A, 83B, 83C, . . . when they are changed. The optical disk 67 is further provided with a region 85 for forming directories of new recorded signals representing information about a diagnosis card, or the like. Also, blocks 86 and 87 and a plurality of directory entry blocks 88A, 88B, 88C, . . . are formed on the first track of the optical disk 67. In the block 86, information about the serial number of each optical disk 67 and a disk surface identification code are recorded. (The serial number of each optical disk 67 and the disk surface identification code will hereinbelow be referred to as the disk number.) The block 87 is used to indicate that information cannot be recorded any more on the optical disk 67. The first directory entry block 88A is used for indicating that a group of the image directories 83A, 83B, 83C, . . . has been formed. The head address and the sector length of the image directory group (i.e. the group of directories formed in the image directory region 82) are recorded in the first directory entry block 88A. In the second directory entry block 88B, the head address and the sector length of the substitution directory group (89A, 89B, 89C, . . .) are recorded. Also, the third directory entry block 88C and the subsequent directory entry blocks are formed for recording head addresses and sector lengths of directory groups for the future.

In the manner described above, the image signal S1 and the information accompanying the image signal S1 (such as the patient information S2, the image characteristics information S3, and the information S4 about the image processing conditions) are sequentially recorded in units of a single image on the optical disk 67. In order that the number of image signals capable of being filed on the optical disk 67 may be kept large, the image signals should preferably be compressed by a known image signal compression technique, and the compressed image signals should be recorded on the optical disk 67. Very large amounts of image signals are recorded on the optical disk 67 in addition to the patient information S2, the image characteristics information S3, and the information S4 about the image processing conditions. If an image signal compression technique is applied, image signals representing approximately 1,000 images can be filed on a single optical disk 67. On the other hand, the recording capacity of the fixed magnetic disk 65 is smaller than the recording capacity of the optical disk 67. However, only the subsidiary information, such as the patient information S2 and the image characteristics information S3, is recorded on the fixed magnetic disk 65. Therefore, by way of example, the subsidiary information corresponding to approximately 1,000,000 images can be filed on the fixed magnetic disk 65.

How the image signal S1 and the subsidiary information, such as the patient information S2 and the image characteristics information S3, are stored on the optical disk 67 and how a data base is constructed from the subsidiary information in the image filing apparatus 50 will hereinbelow be described in detail.

Figure 3:
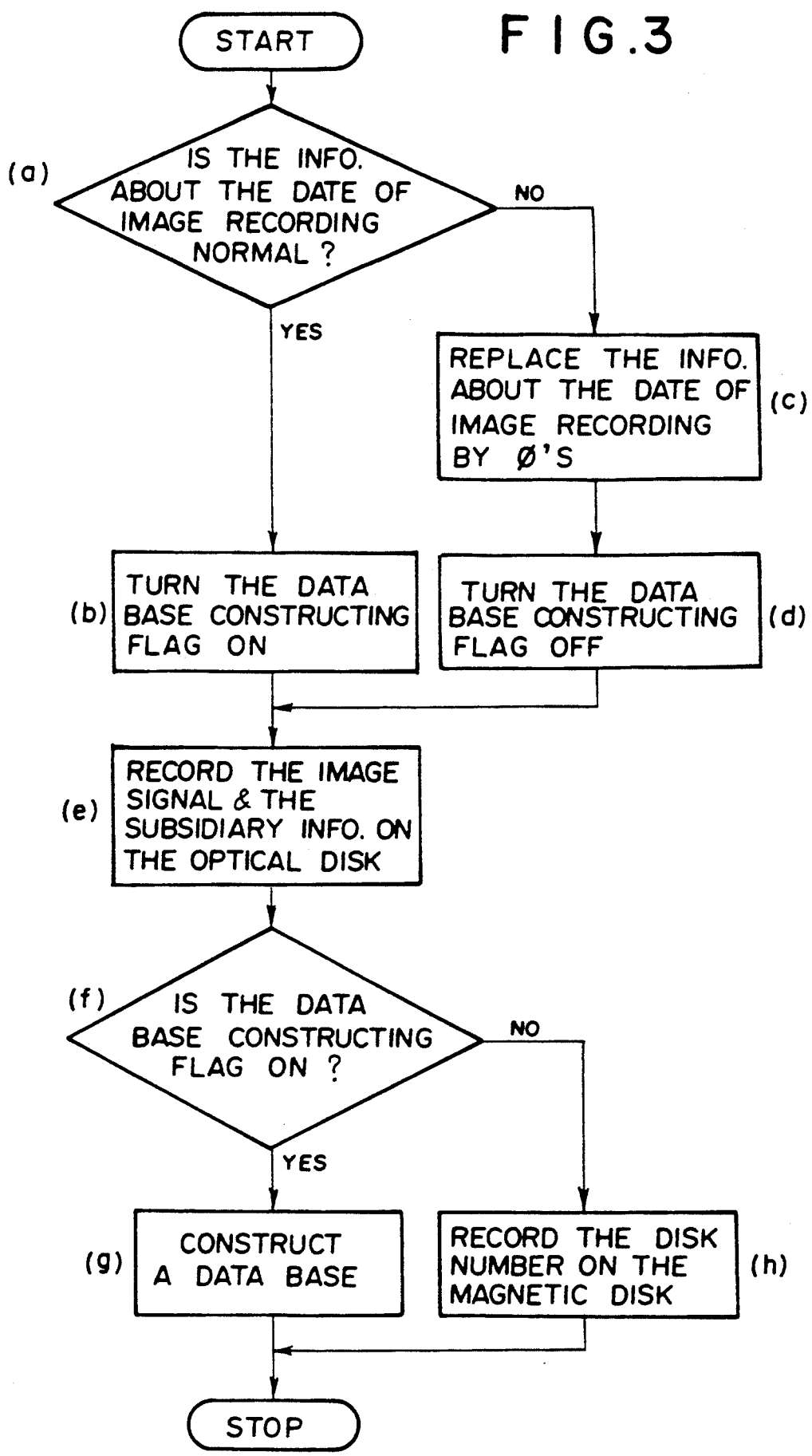
FIG. 3 is a flow chart showing how an image signal and subsidiary information are stored on an optical disk and a data base is constructed.

FIG. 3 is a flow chart showing an example of a job, which is activated when the image signal S1 and the subsidiary information, such as the patient information S2 and the image characteristics information S3, are received from the radiation image recording and readout apparatus 10 shown in FIG. 1. In this example, the subsidiary information includes the date, on which the image was recorded, and a judgment is made as to whether the information about the date, on which the image was recorded, is or is not correct.

First, in step (a), a judgment is made as to whether the information about the date, on which the image was recorded, is or is not normal. In this embodiment, years from 1920 to the current year are judged to be normal, and years before 1920 or years after the current year are judged to be abnormal. Also, months from January to December are judged to be normal. Additionally, judgments are made as to whether the year is or is not a leap year and whether the day is one of the existing days in each month (e.g., 1 to 31 in January). In cases where the day is one of the existing days in each month, it is judged to be normal.

In cases where the information about the date, on which the image was recorded, has been judged to be normal, in step (b), a data base constructing flag is turned on, and construction of a data base is thereby enabled. In cases where the information about the date, on which the image was recorded, has been judged to be abnormal, in step (c), the date is replaced by 0's. Also, in step (d), the data base constructing flag is turned off. Thereafter, in both cases, in step (e), the image signal S1 and the subsidiary information are recorded on the optical disk 67, which is shown in FIG. 1. In cases where the information about the date, on which the image was recorded, has been judged to be abnormal, the information representing 0's is recorded as the date, on which the image was recorded, on the optical disk 67.

Thereafter, in step (f), a judgment is made as to whether the data base constructing flag is or is not on.

In cases where the data base constructing flag is on, a data base is constructed in step (g), which data base is used during the retrieval of the image signal stored on the optical disk 67. The data base is stored on the fixed magnetic disk 65, which is shown in Figure 1. In cases where the data base constructing flag is off, no data base is constructed from the subsidiary information. Therefore, a data base, which has been constructed most recently, is kept on the fixed magnetic disk 65. In such cases, in step (h), information about the disk number of the optical disk 67, on which the subsidiary information judged to be abnormal and the image signal S1 corresponding to the abnormal subsidiary information have been recorded, is recorded on the fixed magnetic disk 65.

In the manner described above, the image signal S1 and the corresponding subsidiary information are stored on the optical disk 67, and a data base is constructed on the fixed magnetic disk 65. The CPU 53, which is shown in FIG. 1, executes the aforesaid job. The combination of the hardware and software functions for constructing the data base constitutes an example of the data base constructing means of the image filing apparatus in accordance with the present invention. Also, the combination of the hardware and software functions for preventing a data base from being constructed constitutes an example of the data base construction preventing means of the image filing apparatus in accordance with the present invention.

Figure 4:
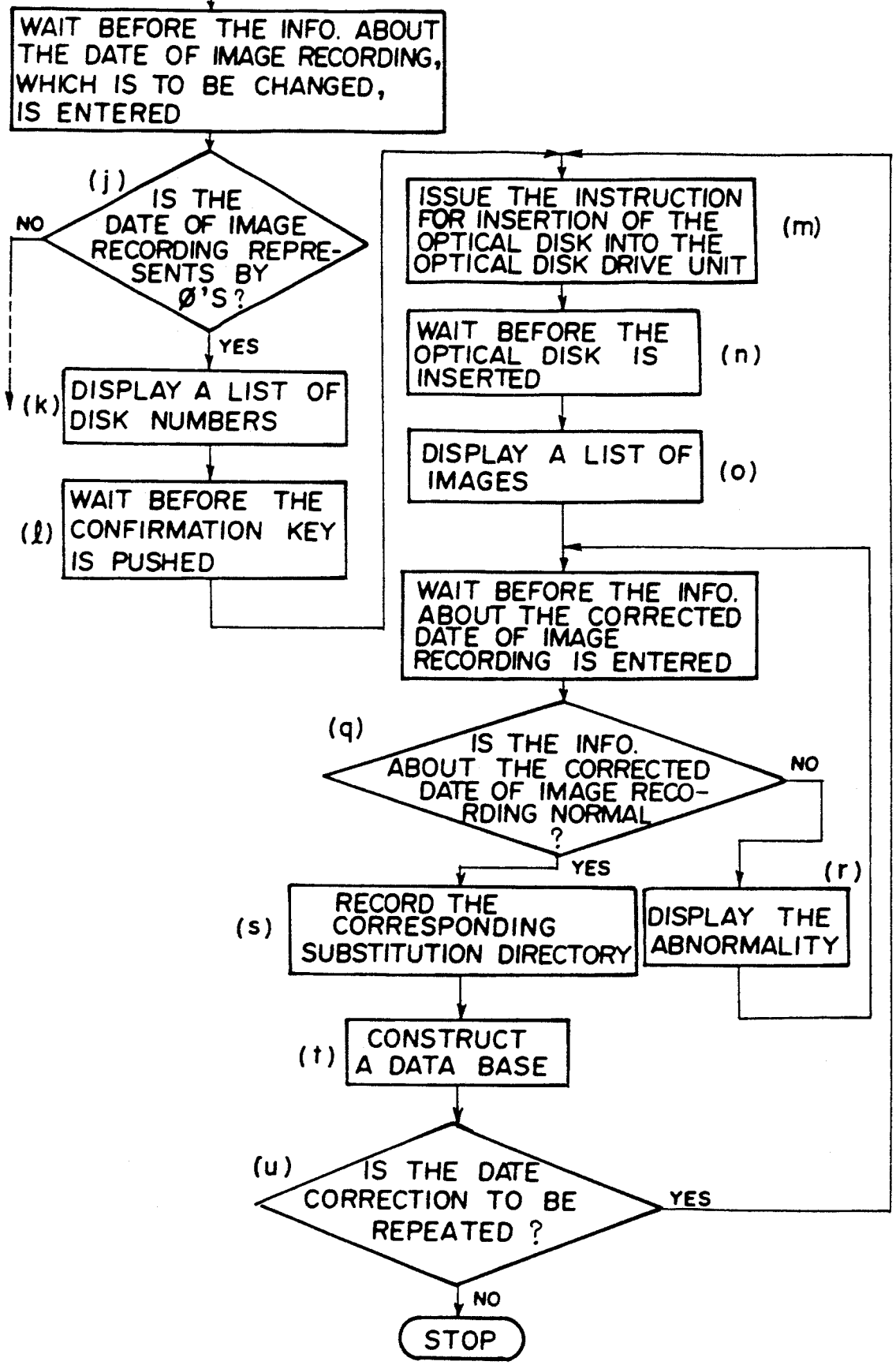
FIG. 4 is a flow chart showing how a data base is reconstructed.

FIG. 4 is a flow chart showing how a data base is reconstructed.

With reference to FIG. 4, a job for reconstructing a data base is started. Thereafter, in step (i), the system waits before the information about the date on which the image was recorded, which information is to be changed, is designated from the keyboard 61A shown in FIG. 1. In step (j), when the information about the date on which the image was recorded is entered from the keyboard 61A, a judgment is made as to whether the information represents 0's.

When the image signal S1 and the corresponding subsidiary information are recorded on the optical disk 67, it often occurs that information about the date, on which the image was recorded and which differs by, for example, one day from a correct date, is judged to be normal. In this embodiment, in such cases, the information about the date on which the image was recorded, which information has been recorded on the optical disk 67, can be corrected. Also, the data base, which has been stored on the fixed magnetic disk 65, can be corrected in accordance with the corrected subsidiary information. Such functions do not constitute the subject of the present invention, and therefore will not be described in more detail.

In cases where it has been judged that the information about the date, on which the image was recorded, said information having been entered from the keyboard 61A, represents 0's, the operation in step (k) is carried out. In step (k), information about the disk numbers of optical disks, which store image signals corresponding to the subsidiary information from which no data base has been constructed, is read from the fixed magnetic disk 65. A list of these disk numbers is displayed on the display unit 61B. The operator of the image filing apparatus confirms the list of the disk numbers, which is displayed on the display unit 61B. (Ordinarily, the operator prepares each optical disk corresponding to each disk number.) Thereafter, the operator pushes a confirmation key. In step (1), the system waits before the confirmation key is pushed. In step (m), the disk number of an optical disk, which is to be inserted into the optical disk drive unit 64, is displayed on the display unit 61B. In step (n), the system waits before the designated optical disk is inserted into the optical disk drive unit 64. After the designated optical disk has been inserted into the optical disk drive unit 64, in step (o), a list of images belonging to files corresponding to the disk number, i.e. a list of the subsidiary information stored in the files, is displayed on the display unit 61B. The operator refers to the displayed list and selects a single image or a plurality of images, for which the date of image recording is represented by 0's. The selection is carried out from the keyboard 61A. Also, the operator enters information about a corrected date, on which the image was recorded, from the keyboard 61A. In step (p), the system waits before the information about the corrected date, on which the image was recorded, is entered. Thereafter, in step (q), a judgment is made as to whether the entered information about the corrected date, on which the image was recorded, is or is not normal. The criteria of judgment made in step (q) are the same as those in step (a), which have been described with reference to FIG. 3. In cases where the entered information about the corrected date, on which the image was recorded, has been judged to be abnormal, the result of the judgment and a message requesting re-input of the information about the date, on which the image was recorded, are displayed on the display unit 61B.

In cases where the entered information about the corrected date, on which the image was recorded, has been judged to be normal, in step (s), the information is recorded on the optical disk 67. Also, one of the substitution directories 89A, 89B, 89C, . . ., which corresponds to the date on which the image was recorded, is written. Thereafter, in step (t), a data base is constructed from the subsidiary information including the information about the corrected date, on which the image was recorded. At this time, construction of the data base is not carried out for all of the images belonging to the files corresponding to the disk number, but is carried out only for one of the substitution directories 89A, 89B, 89C, . . ., which has currently been added. Specifically, when the previous data base was constructed, information about the number of the substitution directories 89A, 89B, 89C, . . ., which were recorded in the region 84 shown in FIG. 2, was stored on the fixed magnetic disk 65. When one substitution directory has been added in the manner described above, a data base is constructed only for the newly added substitution directory. It is sufficient for the data base to be constructed only for the newly added substitution directory. In such cases, the construction of the data base can be completed more quickly than when data bases are reconstructed for all of the images belonging to the files corresponding to the disk number. Thereafter, in step (u), judgments are made as to whether correction of the information about the date, on which the image was recorded, has been or has not been finished for all of the optical disks storing the image signals, for which no data base was constructed. In cases where correction of the information about the date, on which the image was recorded, has not been finished for a certain optical disk, in step (m), insertion of the optical disk into the optical disk drive unit 64 is instructed. Thereafter, the information about the date, on which the image was recorded, is corrected in the same manner as that described above. This job is completed when correction of the information about the date, on which the image was recorded, has been finished for all of the optical disks storing the image signals, for which no data base was constructed. This job is carried out by the CPU 53. The combination of the hardware and software functions for carrying out this job constitutes an example of the data base reconstructing means of the image filing apparatus in accordance with the present invention.

In the embodiment described above, in cases where the information about the date, on which the image was recorded, is found to be abnormal, the date is replaced by 0's as an aid in facilitating the detection of an abnormal date. However, the date need not necessarily be replaced by 0's or other specific values.

Also, in the aforesaid embodiment, in cases where the information about the date, on which the image was recorded, is found to be abnormal, in step (h), the information about the disk number of the optical disk, on which the corresponding image signal and the corresponding subsidiary have been recorded, is recorded on the fixed magnetic disk 65. When the information about the date, on which the image was recorded, is to be corrected, in step (k), a list of the disk numbers is displayed on the display unit 61B. Alternatively, a function for semi-manually correcting the information about the date, on which the image was recorded, may be provided. Specifically, instead of the information about the disk number being stored on the fixed magnetic disk 65, it may be displayed on the display unit 61B, and the operator may take notes of the disk number. Thereafter, the optical disk corresponding to the disk number may be inserted into the optical disk drive unit 64, and the job for correcting the information about the date on which the image was recorded, which information is stored on the optical disk, may be started. The job for reconstructing a data base may then be started, and a certain image signal may be designated. In this manner, a data base for the designated image signal may be reconstructed.

In the aforesaid embodiment, a judgment is made as to whether the information about the date, on which the image was recorded, is or is not normal. Such a judgment, correction of the information, and reconstruction of a data base can be carried out in the same manner also for the other kinds of subsidiary information, such as the information about the branch of medicine, in cases where abnormal information is entered by mistake and expected to affect the retrieval of image signals adversely.

Also, in the aforesaid embodiment, image signals representing medical radiation images are filed. However, the image filing apparatus in accordance with the present invention is also applicable when image signals representing other kinds of medical images and general types of images are filed.

I claim:

1. An image filing apparatus, comprising:
   drive means which is loaded with an optical disk capable of storing a plurality of signals, and with which image signals representing images and subsidiary information associated with each of the images are stored on the optical disk and read therefrom,
   data base constructing means, when the image signals ad the subsidiary information corresponding to each of the image signals are stored on the optical disk loaded into the drive means, for constructing an image signal retrieving data base from the subsidiary information such that an image signal corresponding to the subsidiary information may be retrieved,
   storage means for storing the data base such that the data base can be rewritten,
   data base construction preventing means for inspecting the subsidiary information when an image signal and the subsidiary information corresponding to the image signal are stored on the optical disk loaded into the drive means, and for preventing a data base from being constructed from the subsidiary information when the subsidiary information has been found to be other than predetermined data and for replacing said subsidiary information found to be other than said predetermined data with predetermined data, and
   means for recording information corresponding to a disk number of said optical disk on which the subsidiary information judged to be other than said predetermined data and the image signal corresponding to the subsidiary information judged to be other than said predetermined data have been recorded, onto said storage means.

2. An apparatus as defined in claim 1 wherein said images are medical images.

3. An apparatus as defined in claim 2 wherein said medical images are radiation images.

4. An apparatus as defined in claim 3 wherein said subsidiary information includes a name of an object recorded, and date on which the image was recorded, and portion of an object the image of which was recorded, a mode which was used when the image was recorded, and a number representing a branch of medicine.

5. An apparatus as defined in claim 3, wherein each said radiation image is stored on a stimulable phosphor sheet, said apparatus further comprising means for obtaining an image signal representing each said radiation image by exposing the stimulable phosphor sheet to stimulating rays, whereby the stimulable phosphor sheet emits light in proportion to an amount of energy stored thereon during its exposure to radiation, and by photoelectrically detecting the emitted light.

6. An image filing apparatus, comprising:
   drive means which is loaded with an optional disk capable of storing a plurality of signals, and with which image signals representing images and subsidiary information belonging to each of the images are stored on the optical disk and read therefrom,
   data base constructing means, when the image signals and the subsidiary information corresponding to each of the image signals are stored on the optical disk loaded into the drive means, for constructing an image signal retrieving data base from the subsidiary information such that an image signal corresponding to the subsidiary information may be retrieved,
   storage means for storing the data base such that the data base can be rewritten,
   data base construction preventing means for inspecting the subsidiary information when an image signal and the subsidiary information corresponding to the image signal are stored on the optical disk loaded into the drive means, and for preventing a data base from being constructed from the subsidiary information in cases when the subsidiary information has been found to be other than predetermined data, input means for entering a correction signal, means for using the correction signal to rewrite the subsidiary information, which has been stored on the optical disk loaded into the drive means, data base reconstructing means, when the correction signal is entered from the input means, for reconstructing a data base from subsidiary information, which has been corrected with the correction signal, and means for recording information about a disk number of said optical disk on which the subsidiary information judged to be other than said predetermined data and the image signal corresponding to the subsidiary information judged to be other than said predetermined data have been recorded, onto said storage means.

7. An apparatus as defined in claim 6 wherein said images are medical images.

8. An apparatus as defined in claim 7 wherein said medical images are radiation images.

9. An apparatus as defined in claim 8 wherein said subsidiary information includes name of an object recorded, a date on which the image was recorded, a portion of an object the image of which was recorded, a mode which was used when the image was recorded, and a number representing a branch of medicine.

10. An apparatus as defined in claim 8, wherein each said radiation image is stored on a stimulable phosphor sheet, said apparatus further comprising means for obtaining an image signal representing each said radiation image by exposing the stimulable phosphor sheet to stimulating rays, whereby the stimulable phosphor sheet emits light in proportion to an amount of energy stored thereon during its exposure to radiation, and by photoelectrically detecting the emitted light.

11. An image filing device according to claim 1, wherein said storage means includes a magnetic disk and a magnetic disk drive.

12. An image filing device according to claim 6, wherein said storage means includes a magnetic disk and a magnetic disk drive.

13. An image filing apparatus according to claim 6, wherein said data base construction preventing means includes means of replacing said subsidiary information found to be other than said predetermined data with predetermined data.

14. An image filing apparatus adapted for use with a radiation image read-out apparatus, comprising:

means for receiving a plurality of signals from said radiation image read-out apparatus, said signals representing images and subsidiary information associated with each of the images;

means for determining whether said subsidiary information is other than first predetermined data;

means for replacing said subsidiary information with second predetermined data when said determining means determines said subsidiary information is other than first predetermined data;

means for storing said image signals and said subsidiary information, said subsidiary information being stored when said subsidiary information is said first predetermined data and said subsidiary information having been replaced with second predetermined data being stored when the subsidiary information is other than said first predetermined data;

data base constructing means, when the image signals and the subsidiary information corresponding to each of the image signals are stored in said storing means, for constructing an image signal retrieving data base from the subsidiary information such that an image signal corresponding to the subsidiary information may be retrieved;

data base storing means for storing the data base such that the data base can be rewritten;

data base construction preventing means for inspecting the subsidiary information when an image signal and the subsidiary information corresponding to the image signal are stored on the storing means, and for preventing a data base from being constructed from the subsidiary information when the subsidiary information has been found to be other than said firs predetermined data; and means for storing on said data base storing means data corresponding to a position, on the storing means, of an image signal and associated subsidiary information determined to be other than said first predetermined data, when said data base construction preventing means prevents a data base from being constructed.

* * * * *